G. H. BRABROOK.
ORNAMENTAL GLASS.
APPLICATION FILED MAR. 20, 1905.

921,355.

Patented May 11, 1909.

Witnesses:
J. Henry Parker
Alice H. Morrison

Inventor:
George Hale Brabrook
by Macleod, Calver, Cushman & Dike
Attorneys.

UNITED STATES PATENT OFFICE.

GEORGE HALE BRABROOK, OF TAUNTON, MASSACHUSETTS.

ORNAMENTAL GLASS.

No. 921,355.   Specification of Letters Patent.   Patented May 11, 1909.

Application filed March 20, 1905. Serial No. 250,973.

*To all whom it may concern:*

Be it known that I, GEORGE HALE BRABROOK, a citizen of the United States, residing at Taunton, county of Bristol, State of Massachusetts, have invented a certain new and useful Improvement in Ornamental Glass, of which the following is a specification, reference being had therein to the accompanying drawings.

My invention has for its object to provide an improved ornamental glass.

The invention is fully set forth in the following specification, taken in connection with the accompanying drawings, and the novel features thereof are pointed out and clearly defined in the claims at the close of this specification.

In the accompanying drawings I have shown a piece of glass having thereon a conventional figure, the whole embodying my invention.

Figure 1:
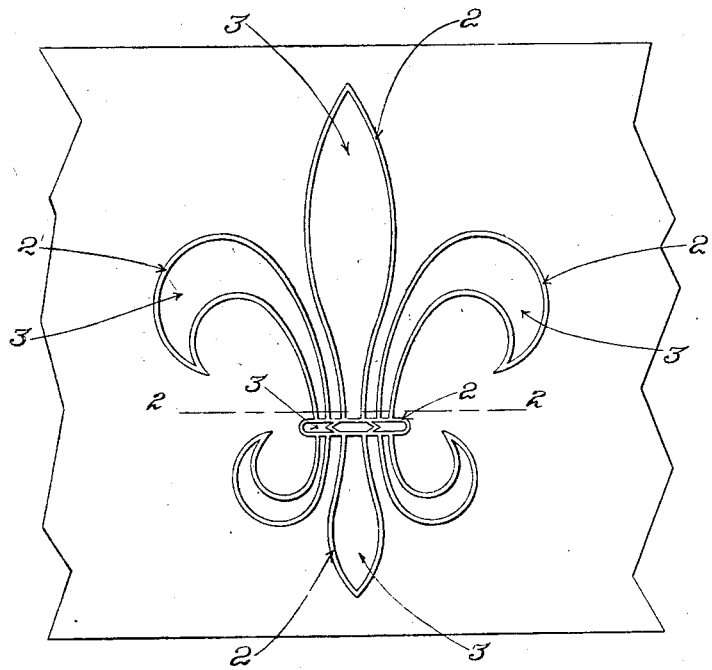
Figure 2:
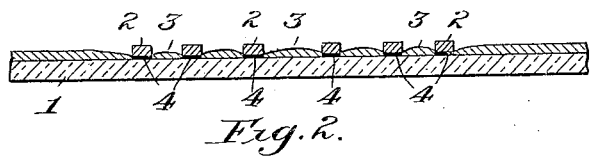

Figure 1 is a plan view of a sheet of glass provided with ornamentation produced according to my invention. Fig. 2 is a section on line 2—2 of Fig. 1 of exaggerated size and thickness.

Stained or leaded glass, such as is used in windows as also in a large variety of smaller articles which it is desired shall be ornamental and artistic is expensive to produce. As commonly made it consists of a number of properly shaped and colored pieces of glass which are united to form a window or other desired object of a given design by means of leaden strips. Such leaded glass is not only difficult to produce and expensive, but it is impossible to obtain certain effects which may be obtained in a design which is drawn and colored on canvas, glass, porcelain or other surface.

By the employment of my invention I am enabled to produce a stained glass having all the characteristics of leaded glass at very much less expense and I am also enabled to produce certain effects which it is possible to produce by drawing and coloring on surfaces such as canvas, porcelain and the like.

In the production of glass embodying my invention I may employ glass of any form, such for example as flat sheets of transparent glass, or articles of glass such for example as lamp shades, and the like.

I first put the lines 4 of the design, which will correspond with the leading on a piece of leaded glass, on the glass 1, painting the lines 4 thereon with a paint composed preferably of finely divided metallic silver and a suitable flux such as red lead, silica and borax mixed with oil of lavender, or having any of the well known ingredients. The glass is then placed in a kiln and heated sufficiently to fix the metallic paint. The glass will then have the appearance of plain leaded glass, the metallic paint representing the leaded portions or strips. The areas of glass intermediate or outside the lines or areas 4 are then so far as may be desired, covered with enamel 3 in any of the methods well known to the art. For example, the enamel may be ground and mixed with water and applied with a spatula. The glass is then heated sufficiently to fuse the enamel and this process of applying the enamel and fusing it may be repeated as many times as it may be necessary to get the required depth of color and variegated effects produced by the shading of the colors, which are frequently desirable to increase the richness of the effect of the whole design. After the firing has been completed, the article may be placed in a bath and metal 2 electro-deposited on the metallic surfaces 4 which separate the areas covered by the enamel, and these metallic surfaces may thus be coated or plated with metal, such for example as silver or copper. The metal may then either be burnished smooth or left with a rough effect as given by the deposited metal, or it may be oxidized, bronzed or gilded. The deposited metal will firmly adhere to the mixture of flux and metallic silver which is thoroughly secured in place by being burned into the glass.

As will be clear this method of treatment may be applied to either one or both surfaces of the glass, or the metal work may be done on one side of the glass and the enamel on the other.

I have also found in practice that the metallic silver and flux used on the lines or areas 4 and the enamel on the surfaces 3 may be applied at the same time, that is, instead of firing after the metallic silver and flux is applied the enamel is applied and then the whole is fired. In this case, however, I prefer to mix the powdered enamel with some essential oil instead of water.

By my invention a stained glass may be produced with intricate designs in which the enameled areas may be as small in size as desired, and of any shape. Thus I am enabled to produce effects of peculiar value and richness, especially on small articles in which the designs are fine or delicate.

I am also enabled to combine the effects of my glass with those of glass as commonly made and I prefer in large work to make the work in sections of suitable size for convenient firing and these sections I unite or secure together by leading in the well known manner.

What I claim is;

1. The process of making imitation leaded glass consisting of painting upon vitrified material with metallic paint lines which form a design, coating with enamel portions of the surface of the glass which are not covered by the metal lines, subjecting the glass to heat to fix the metal to the glass and to fuse the enamel and electro plating the lines of metal.

2. The process of making imitation leaded glass consisting of painting with metallic paint combined with a suitable flux directly upon a sheet of glass lines which form a design, coating with enamel the portions of the surface of the glass which are not covered by the metal lines and subjecting to heat the glass thus treated to fix the metal to the glass and to fuse the enamel into the glass.

3. The process of making imitation leaded glass consisting of painting with metallic paint combined with a suitable flux directly upon a sheet of glass lines which form a design, coating with enamel the portions of the surface of the glass which are not covered by the metal lines and subjecting to heat the glass thus treated to fix the metal to the glass and to fuse the enamel and electroplating the lines of metal.

4. The process of making imitation leaded glass consisting of painting lines which form a design upon a sheet of glass with a paint composed of finely divided metallic silver and a suitable flux, coating with enamel the portions of the surface of the glass which are not covered by the metal lines and subjecting to heat the glass thus treated to fix the metal to the glass and to fuse the enamel.

In testimony whereof I affix my signature, in presence of two witnesses.

GEORGE HALE BRABROOK.

Witnesses:
WM. A. MACLEOD,
ALICE H. MORRISON.